United States Patent
Evans

(10) Patent No.: US 9,031,864 B2
(45) Date of Patent: May 12, 2015

(54) SYSTEM, DEVICE, METHOD, AND MEDIUM FOR PROCESSING SALES AND NON-MONETARY TRANSFERS

(76) Inventor: Mark Alan Evans, Naples, FL (US)

(*) Notice: Subject to any disclaimer, the term of this patent is extended or adjusted under 35 U.S.C. 154(b) by 342 days.

(21) Appl. No.: 13/542,052

(22) Filed: Jul. 5, 2012

(65) Prior Publication Data

US 2013/0080277 A1 Mar. 28, 2013

Related U.S. Application Data

(60) Provisional application No. 61/539,980, filed on Sep. 28, 2011.

(51) Int. Cl.
G06Q 20/00 (2012.01)
G06Q 20/20 (2012.01)
G06Q 10/08 (2012.01)
G06Q 40/02 (2012.01)

(52) U.S. Cl.
CPC ............ *G06Q 20/203* (2013.01); *G06Q 20/201* (2013.01); *G06Q 10/087* (2013.01); *G06Q 40/02* (2013.01)

(58) Field of Classification Search
CPC .................................................. G06Q 20/201
USPC ............................... 705/7.35, 16, 20, 22, 400
See application file for complete search history.

(56) References Cited

U.S. PATENT DOCUMENTS

| | | | |
|---|---|---|---|
| 7,778,933 B2 | 8/2010 | Robinson et al. | |
| 2003/0014317 A1 | 1/2003 | Siegel et al. | |
| 2003/0098910 A1 | 5/2003 | Kim | |
| 2005/0234786 A1 | 10/2005 | Aggarwal | |
| 2007/0214065 A1 | 9/2007 | Kahlon et al. | |
| 2009/0112707 A1 | 4/2009 | Weiss et al. | |
| 2009/0192922 A1 | 7/2009 | Hahn-Carlson | |
| 2011/0079648 A1* | 4/2011 | Pourfallah | 235/492 |
| 2011/0191252 A1 | 8/2011 | Dai | |
| 2013/0041675 A1* | 2/2013 | Cunningham et al. | 705/2 |

OTHER PUBLICATIONS

Microsoft, "User's Guide: Microsoft Dynamics Retail Management System Store Operations", Nov. 2006, 516 pgs.*
Breitkoph, David, "The Tech Scene: First Data: New Terminal POS Lift for Small Outfits", American Banker. New York, N.Y., Jan. 17, 2007, vol. 172, Iss. 11; p. 17.
Sell.It! Point of Sale Users Manual, pp. 1-115 [received via email on May 18, 2009].

* cited by examiner

*Primary Examiner* — Hunter Wilder
(74) *Attorney, Agent, or Firm* — Posz Law Group, PLC

(57) ABSTRACT

A system is described that processes transactions as sales and non-monetary transfers. Processing occurs in a cycle where at a single prompt, a transaction is identified as a sale or a non-monetary transfer. A good that is the subject of the transaction is also identified. The good, and either a sales price or cost price, depending on whether the transaction is a sale or a non-monetary transfer, respectively, is displayed. A record of the transaction, including whether the transaction is a sale or a non-monetary transfer and the sales price or cost price, respectively, is created and stored. An inventory count record is adjusted to reflect an adjustment to inventory based on the occurrence of the transaction. The system that processes transactions as sales and non-monetary transfers may include multiple devices in a server/client architecture or may include a single device. A corresponding method and storage medium are also described.

24 Claims, 13 Drawing Sheets

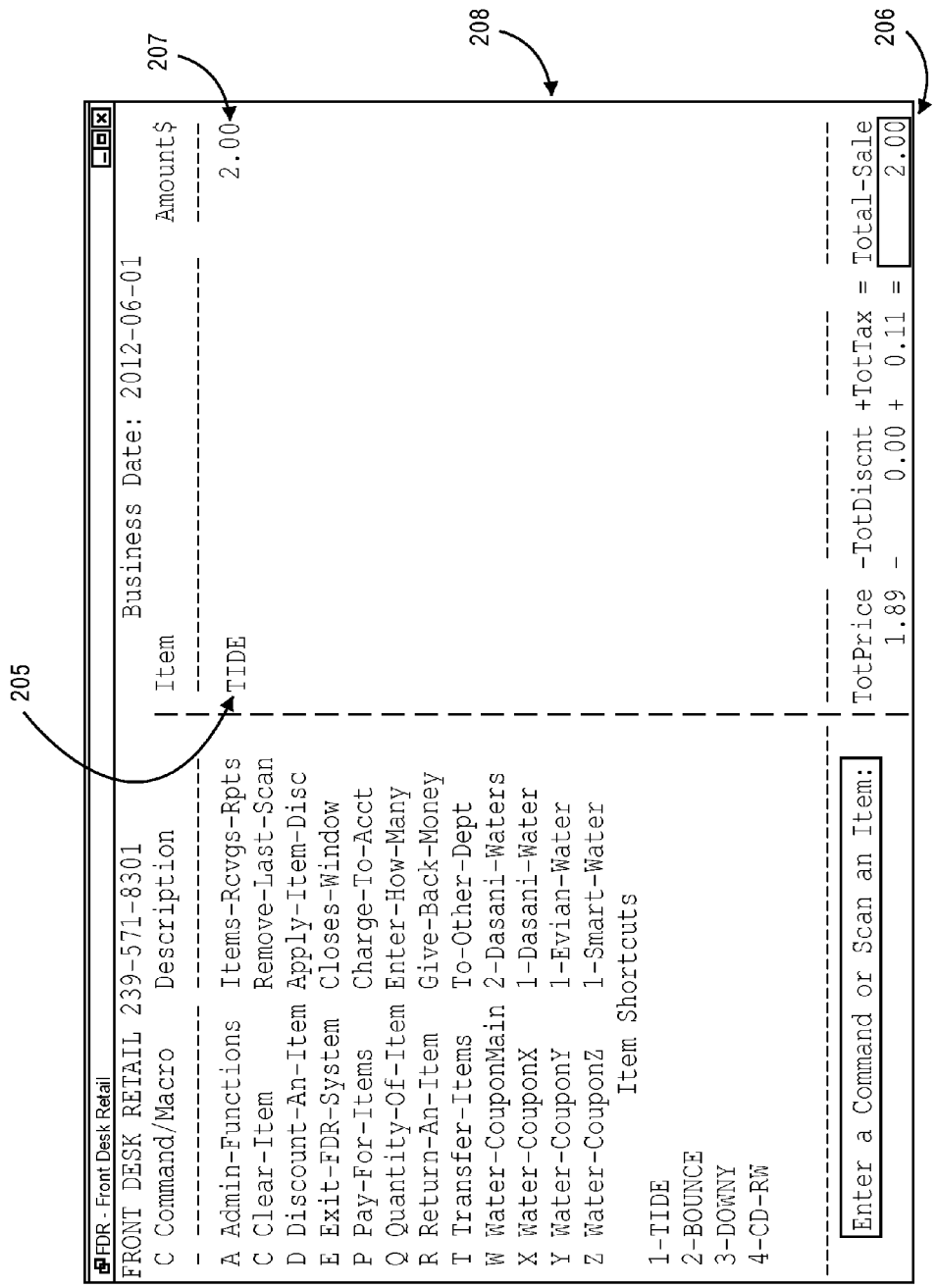
FIG. 2B(1)

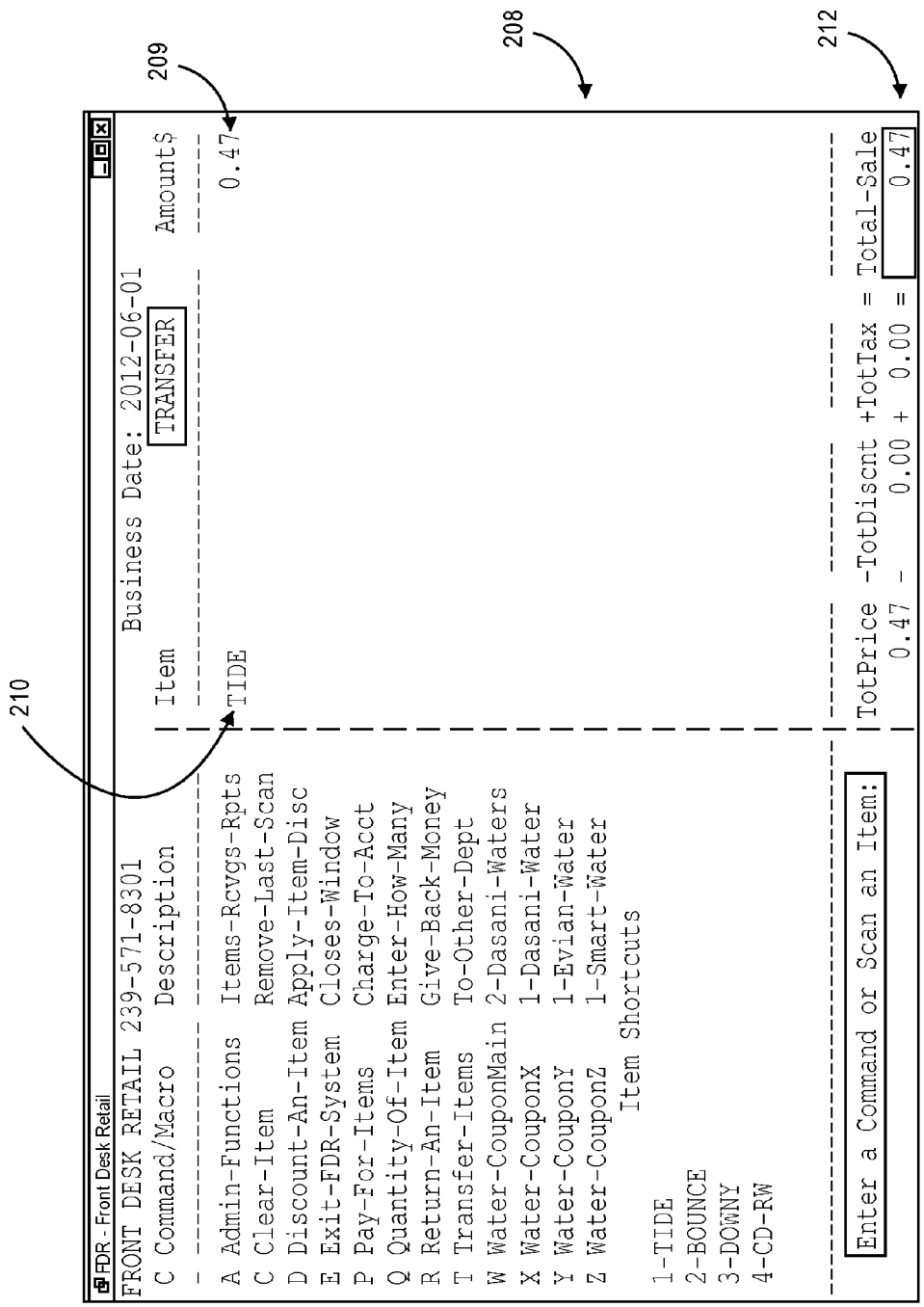
FIG. 2B(2)

216
```
***********************************
Fancy Hotel & Suites, New York City, NY
-----------------------------------
Fancy Hotel Convenience Shop and Market
```
205 
```
Item                              Amount$      214
------------------------------    -------
HANDY SOLUTIONS TAMPONS              6.00
  Quantity:       2
ALWAYS PANTILINERS                   3.00                211
--------  --------  ------    ----------
TotPrice -TotDiscnt +TotTax = Total-Sale
    8.49 -     0.00 +  0.51 =       9.00
Trans. Date & Time:   2012-06-01 07:21:54
Charge To: C H16                2012-06-01
Sale Number:   11011, P:27495,T:pts/0   N
************************************************
            226
```
FIG. 2C(1)

218

```
**********************************************
     Fancy Hotel & Suites, New York City, NY
     ----------------------------------
     Fancy Hotel Convenience Shop and Market Item                                    Amount$
---------------------------------       -------
DASANI PURIFIED WATER                      1.48
 Quantity:      2
---------  ---------  ------  ----------

TotPrice -TotDiscnt +TotTax = Total-Sale
    1.48 -     0.00 +  0.00 =      1.48

This product is being TRANSFERRED @ Cost

Trans. Date & Time:  2012-06-05 16:58:59
Charge To: R TR-R                  2012-06-05
Sale Number:   111102, P: 8991,T:pts/0   N
**********************************************
```

205 → (Item)
220 → (Amount)
213 → (TRANSFERRED @ Cost)
228 → (Sale Number)

FIG. 2C(2)

```
FDR - Front Desk Retail                                         _ □ x
FRONT DESK RETAIL 239-571-8301        Business Date: 2012-06-01
C Command/Macro    Description       | Item            Amount$
-----------------------------------  |------------------------
A Admin-Functions  Items-Rcvgs-Rpts  | TIDE              2.00
C Clear-Item       Remove-Last-Scan  | BOUNCE            2.00
D Discount-An-Item Apply-Item-Disc   | DOWNY             2.00
E Exit-FDR-System  Closes-Window     | CD-RW             4.00
P Pay-For-Items    Charge-To-Acct
Q Quantity-Of-Item Enter-How-Many
R Return-An-Item   Give-Back-Money
T Transfer-Items   To-Other-Dept
W Water-CouponMain 2-Dasani-Waters
X Water-CouponX    1-Dasani-Water
Y Water-CouponY    1-Evian-Water
Z Water-CouponZ    1-Smart-Water
        Item Shortcuts
1-TIDE
2-BOUNCE
3-DOWNY
4-CD-RW
                                     --------------------------
                                     |TotPrice -TotDiscnt +TotTax = Total-Sale
                                     |  9.44  -   0.00  +  0.56  =    10.00
-------------------------------------
| Enter a Command or Scan an Item: |
------------------------------------
```

205 (arrow pointing to item list)
215 (arrow pointing to command list)

FIG. 2D(1)

```
┌─ FDR - Front Desk Retail ─────────────────────────────────────────────────┬─□×─┐
│ FRONT DESK RETAIL 239-571-8301       Business Date: 2012-06-01            │    │
│ C Charge-To        Room/Account      Item                        Amount$  │    │
│ -----------------------------------  -----------------------------------  │    │
│ C Cash/Credit-Card H16               TIDE                           2.00  │    │
│ E Exit             Exit&Scan-More    BOUNCE                         2.00  │    │
│ M Manual-Posting   ManualPost-OnQ    DOWNY                          2.00  │    │
│ R Room-Charge      <specify>         CD-RW                          4.00  │    │
│                                                                           │    │
│                                                                           │    │
│                                     ─────────────────────────────────────│    │
│                                      TotPrice -TotDiscnt +TotTax = Total-Sale │
│                                        9.44  -   0.00   +  0.56  =   10.00│    │
│ ┌──────────────────────────────┐                                          │    │
│ │ Enter Code for Charge-To:    │                                          │    │
│ └──────────────────────────────┘                                          │    │
└───────────────────────────────────────────────────────────────────────────┴────┘
  ↑                ↑
 219              221                                                  ← 205

FIG. 2D(2)
```

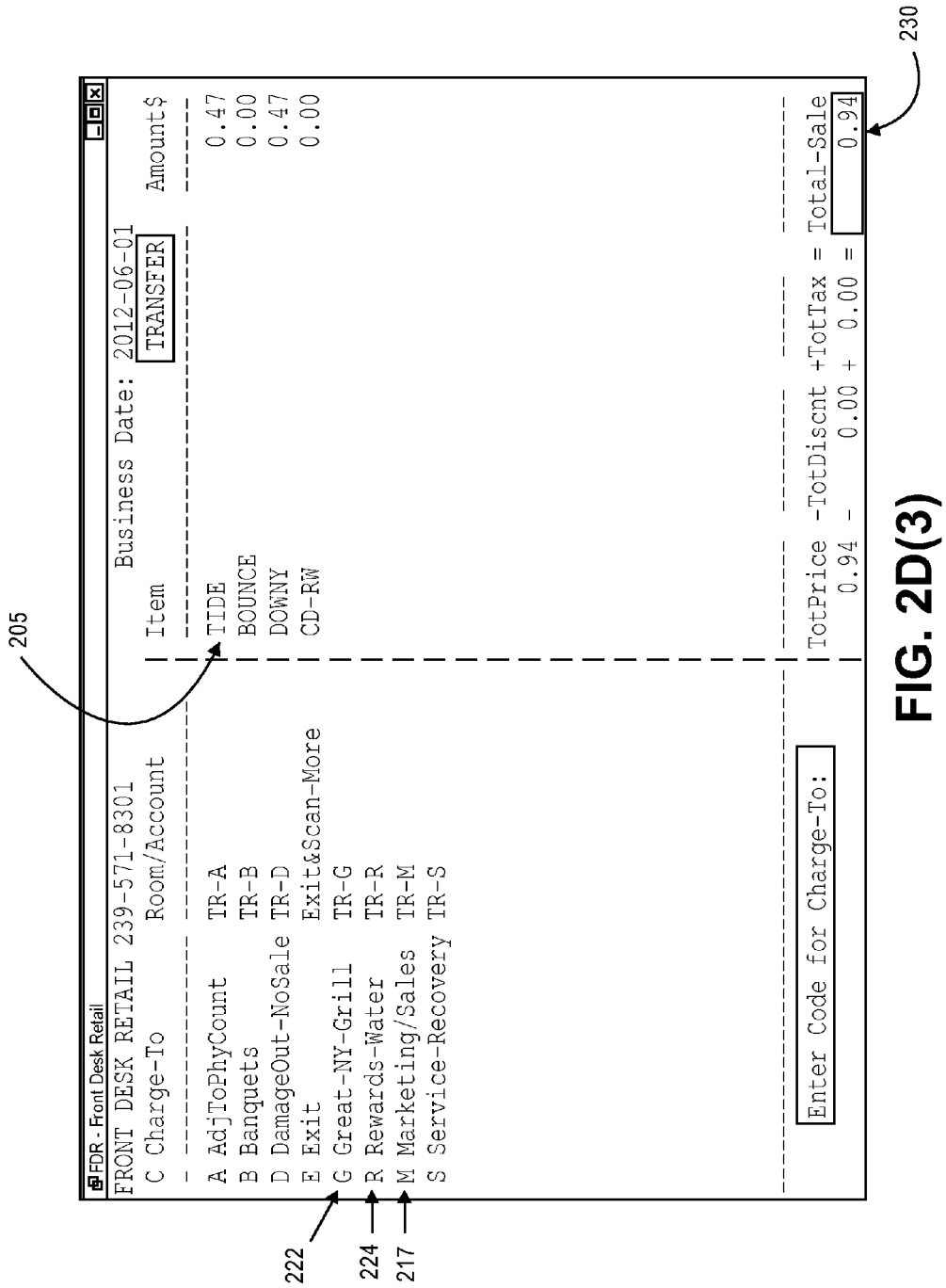
FIG. 2D(3)

```
┌─user-FDR──────────────────────────────────────────────────────────────■□x┐
│      Fancy Hotel & Suites, New              Fancy Hotel Convenience      │
│             York City, NY                       Shop and Market          │
│      ─────────────────────────              ──────────────────────       │
│  RETAIL SALES SUMMARY        Business Date: 2012-05-01 to 2012-05-31   Page: 1 │
│  ==============================================================================│
│                                SALES-REVENUE                             │
│                                                                          │
│  C Category       Account             Price - Discount +    Tax =  Retail│
│  ─────────────    ──────────────     ───────   ────────    ──────  ──────│
│  C Cash/Credit-Card H16               655.61 -   43.70  +   35.09 =  647.00│
│  M Manual-Posting ManualPost-OnQ           -         -  +        =        │
│  R Room-Charge    <specify>           981.06 -       -  +   56.69 = 1,037.75│
│  ─────────────────────────────       ───────   ────────    ──────  ──────│
│  * Totals:        All-Accounts      1,636.67 -   43.70  +   91.78 = 1,684.75│
│  ==============================================================================│
│                             INHOUSE-TRANSFER(Cost$)                      │
│                                                                          │
│  C Category       Account             Price - Discount +    Tax =  Retail│
│  ─────────────    ──────────────     ───────   ────────    ──────  ──────│
│  A AdjToPhyCount  TR-A                     -         -  +        =        │
│  B Banquets       TR-B                7.12 -         -  +        =    7.12│
│  D DamageOut-NoSale TR-D                   -         -  +        =        │
│  G Great-NY-Grill TR-G               23.52 -         -  +        =   23.52│
└──────────────────────────────────────────────────────────────────────────┘
```

```
Fancy Hotel & Suites, New              Fancy Hotel Convenience
York City, NY                            Shop and Market Physical Inventory Variance Report for count on: 2012-05-31 11:25:34      Page: 1
==========================================================================================
Class      Item-Description               Stck+Disp=TCnt-OnHd=Vari+EA-Cost-Var-Amt
---------- ------------------------------ ---------------------------------------
BEVERAGES  COCA COLA CLASSIC               0+   0=   0-  77= -77*  0.74= -56.98
BEVERAGES  COCA-COLA ZERO                  0+   0=   0-  68= -68*  0.74= -50.32
BEVERAGES  DASANI PURIFIED WATER           0+ 188= 188--590= 778*  0.74= 575.72
BEVERAGES  DIET COKE                      48+   0=  48- -39- -87*  0.71=  61.77
BEVERAGES  FANTA ORANGE                    0+  14=  14-  -8=  22*  0.00=   0.00
BEVERAGES  GLACEAU SMART WATER             0+  35=  35- -21=  56*  1.02=  57.12
BEVERAGES  GLACEAU VITAMIN WATER           0+  34=  34-  19=  15*  1.21=  18.15
BEVERAGES  HONEST ADE ORANGE MANGO         0+  22=  22-  22=   0*  1.17=   0.00
BEVERAGES  HONEST ADE POMEGRANATE BLUE     0+  19=  19-  20=  -1*  0.00=   0.00
BEVERAGES  HONEST ORGANIC HALF TEA & LEMO  0+  25=  25-  25=   0*  1.17=   0.00
BEVERAGES  HONEST ORGANIC HONEY GREEN TEA  0+  19=  19-  39= -20*  1.17= -23.40
BEVERAGES  MINUTE MAID APPLE JUICE         0+  28=  28-  30=  -2*  0.00=   0.00
BEVERAGES  MINUTE MAID LEMONADE            0+  16=  16-  -7=  23*  0.00=   0.00
BEVERAGES  MINUTE MAID ORANGE JUICE        0+  20=  20-  -2=  22*  1.33=  29.26
BEVERAGES  MONSTER ENERGY GREEN            0+  44=  44-  47=  -3*  1.41=  -4.23
```

SYSTEM, DEVICE, METHOD, AND MEDIUM FOR PROCESSING SALES AND NON-MONETARY TRANSFERS

CROSS-REFERENCE TO RELATED APPLICATIONS

This application claims the benefit of U.S. provisional patent application 61/539,980, filed Sep. 28, 2011, which is expressly incorporated herein by reference.

TECHNICAL FIELD

The technical field relates in general to sales and transfers, and inventory record keeping, in a point-of-transaction environment.

BACKGROUND

Most stores and shops that offer goods to the public utilize well established procedures for tracking revenue and inventory at a point of sale. However, there are many occasions where these same stores and shops must provide a good to a member of the public without receiving payment from the recipient of the good. One frequently observed example of such a transaction is where due to some sort of dissatisfaction on the part of a consumer, the shop provides the consumer with a product free of charge.

In such a transaction, a good is being transferred to consumer but payment is not received. In some sense though, payment is being received: the shop merchant is actually paying for the good; however the price paid is simply the cost paid by the merchant to obtain the good for the shop. The price paid to obtain the good for the shop is often referred to as a cost price, and that convention is adopted herein.

In any transaction where a product is provided to a consumer without requiring payment for the product, the transaction can be treated as a transfer where the cost price is attributed to some party. In the example above, the shop itself is the party to whom the cost price is attributed. However, there are situations where a store is but one part of a much larger merchant. In that situation, a non-monetary transfer of a good to a consumer can be attributed to another part or branch of the merchant.

A classic example of a store or shop that is but one part of a larger merchant is the convenience store or gift shop in a hotel. The typical hotel convenience store provides various items such as toiletries, snacks, and beverages to hotel guests so the guests do not have to leave the premises of the hotel. While the hotel convenience store typically sells items to hotel guests, there are many occasions where items in the store are provided to a guest without requiring payment.

Examples of such non-monetary transfers occur where for example, a guest is a member of a hotel rewards program that provides free beverages. Another example may be where the marketing department of a hotel is providing drinks or snacks to hotel guests and members of the public at large. In some instance, items of the hotel shop may be taken for use by the hotel restaurant, if for example the restaurant exhausts its supply of soda or chips. In such a situation, the transfer of the goods is to another employee of the hotel rather than a guest. However, accounting for non-monetary transfers focuses on to whom the cost is attributed rather than who actually receives the goods.

Conventional point-of-sale (POS) software systems are lacking in a way to adequately deal with both sales and non-monetary transfers of goods out of the inventory of a shop. Many POS systems do not even account for such non-monetary transfers out of inventory. Others POS systems treat non-monetary transfers with a completely different processing paradigm as compared with a sale. A need exists for a comprehensive system (which may be referred to as a point-of-inventory transaction system or "POINT" system) that dynamically and efficiently determines whether a transaction is a sale or a non-monetary transfer and subsequently records and accounts for both types of transactions.

SUMMARY

Accordingly, one embodiment disclosed herein provides a system comprising a server device and a point-of-transaction (POT) client device. The server device includes a server processor, a server memory, a server input, and a server display. The POT client device includes a client processor, a client memory, a client input, and a client display. The POT device is connected over a network with the server device.

The server device and the POT device implement a transaction cycle. The transaction cycle includes the POT device accepting through the client input, at a prompt from a single screen in the client display, an identification of a transaction as a sale or as a non-monetary transfer. The POT device further accepts through the client input, an identification of a good that is a subject of the transaction. The identified good is to be delivered out of an inventory of a first entity to a second entity upon completion of processing the transaction.

In the transaction cycle, the server device communicates a sales price, stored in the server memory, to the POT device when the transaction is identified as a sale. The POT device then displays on the client display a first indication of the good along with a sales price of the good. The server device communicates a cost price of the good, reflecting a cost of the first entity to obtain the good for the inventory, to the POT device when the transaction is identified as a non-monetary transfer. The POT device then displays on the client display a second indication of the good along with the cost price of the good.

The transaction cycle further includes the server device creating and storing in the server memory a record of the transaction including whether the transaction is the sale or the non-monetary transfer of the good and the sales price or the cost price, respectively. The server device lastly adjusts an inventory count record based on the occurrence of the transaction. The inventory count record is representative of the number of units of the good on hand the inventory and stored in the server memory.

Also disclosed is a method, implemented by a computer, comprising performing, a transaction cycle. The transaction cycle includes, in response to an identification of a transaction as her a sale or, a non-monetary transfer, the identification having been made in response to a prompt from a single screen as to whether the transaction is a sale or a non-monetary transaction, and in response to an identification of a good that is a subject of the transaction, the good to be delivered out of an inventory of a first entity to a second entity upon completion of the transaction, the computer displaying, or causing to be displayed by another computer a first indication of the good and a sales price of the good stored in the computer, when the transaction is identified as a sale.

The transaction cycle further includes displaying a second indication of the good and a cost price of the good stored in the computer when the transaction is identified as a non-monetary transfer. The cost price reflects a cost of the first entity to obtain the good for the inventory. The transaction cycle also includes the computer creating and storing a record of the transaction. The record of the transaction includes whether the transaction is the sale or the non-monetary transfer of the good and the sales price or the cost price, respectively.

The transaction cycle also includes adjusting an inventory count record stored in the computer, the inventory count record being representative of the number of units of the good on hand in the inventory based on the occurrence of the transaction. This step along with the other steps in the transaction cycle may be stored, as instructions, on a non-transitory computer readable storage medium as instructions. The instructions when executed by a computer implement the method.

A computer apparatus is also disclosed herein. The computer apparatus comprises a transceiver, a network interface, a memory, and a display. The transceiver is operable to transmit and receive communications over at least a portion of a wireless network. The network interface is operable to transmit and receive communications over at least a portion over a wired network.

The processor is cooperatively operable with the transceiver, the network interface, and the memory. The processor is configured to perform a transaction cycle. The transaction cycle includes, in response to an identification of a transaction as either a sale or a non-monetary transfer, the identification having been made in response to a prompt from a single screen as to whether the transaction is a sale or a non-monetary transaction, and in response to an identification of a good that is the subject of the transaction, the good to be delivered out of an inventory of a first entity to a second entity upon completion of the transaction, displaying, or causing to be displayed by another computer, a first indication of the good and a sales price of the good stored in a memory of the computer, when the transaction is identified as a sale.

The transaction cycle also includes displaying a second indication of the good and a cost price of the good, reflecting a cost of the first entity to obtain the good for the inventory, stored in the memory, when the transaction is identified as a non-monetary transfer. The transactions cycle further includes creating and storing in the computer, a record of the transaction including whether the transaction is the sale or the non-monetary transfer of the good and the sales price or the cost price, respectively. The last described function of the transaction cycle is adjusting an inventory count record stored in the computer, the inventory count record being representative of the number of units of the good on hand in the inventory based on the occurrence of the transaction.

It should be noted that the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIGS. 2A-2E are exemplary screen shots from a point-of-transaction system for processing sales and non-monetary transfers.

DETAILED DESCRIPTION

Figure 1:
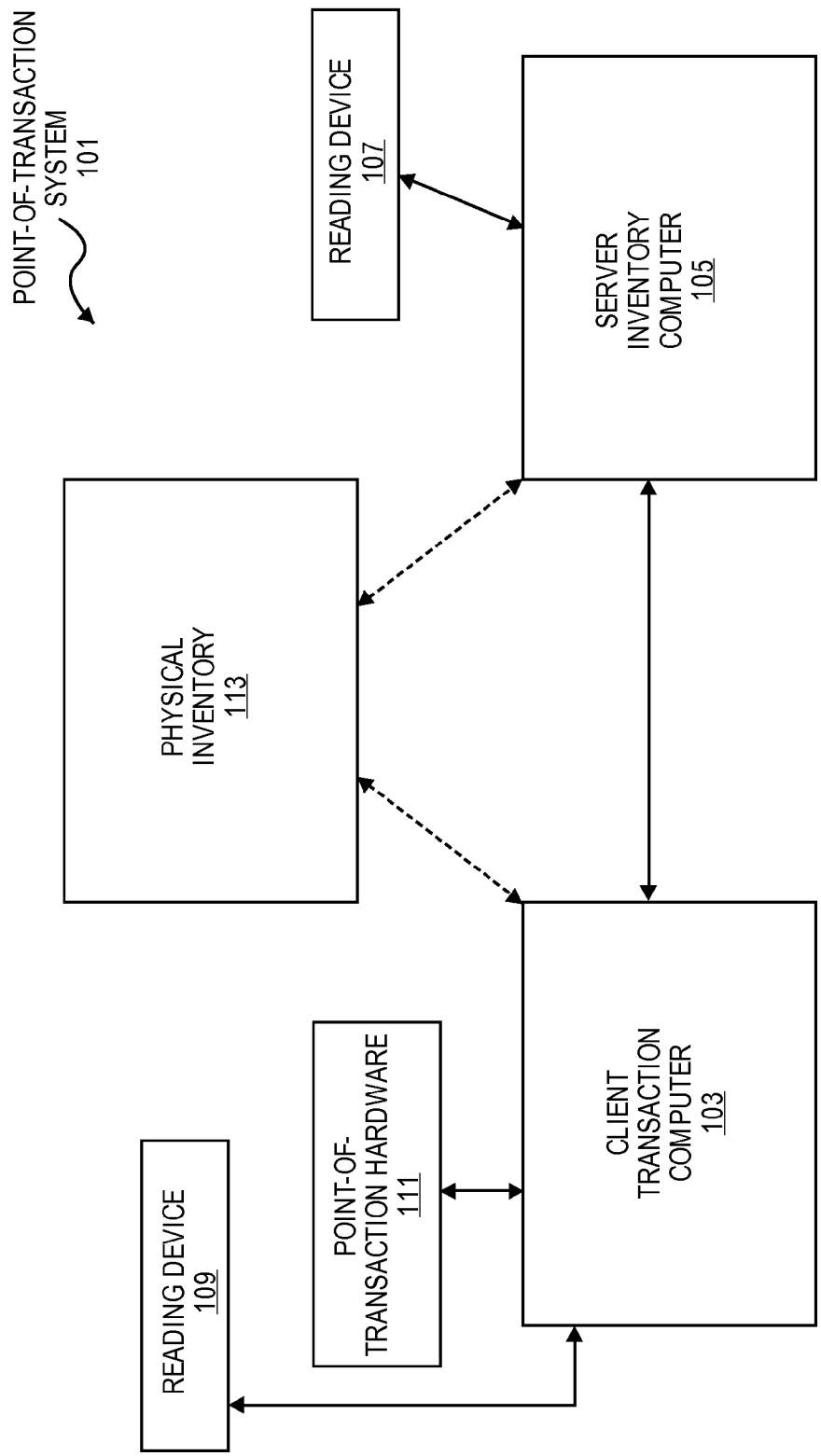
FIG. 1 is a functional block diagram illustrating a point-of-transaction system for processing sales and non-monetary transfers.

In overview, the present disclosure relates to processing sales and non-monetary transfers to consumers in a shop or store. The processing takes place at the point of the transaction, and can be implemented in a single computer apparatus or in a server/client architecture. The processing includes not only recording and accounting for transactions that are either a sale or a non-monetary transfer, but also adjusting inventory records irrespective of the type of transaction.

The instant disclosure is thus provided to further explain a enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possible significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

It should furthermore be noted that with respect to network communications and/or wireless communications, the networks of interest include those that transmit information in packets such as packet switching networks. In such networks, messages are divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (General Packet Radio Service), I-mode and other wireless application protocols, and/or other protocol structures, and variants and evolutions thereof. Such networks can provide wireless communications capability and/or utilize wireline connections such as cable and/or a connector, or similar.

As further discussed herein below, various inventive principles and combinations thereof are advantageously employed to dynamically and efficiently determine whether a transaction is a sale or a non-monetary transfer and subsequently records and accounts for both types of transactions. Thus referring now to FIG. 1, a functional block diagram illustrating a point-of-transaction system 101 for processing sales and non-monetary transfers is discussed and described. The point-of-transaction system 101 includes a server inventory computer 105 and a client transaction computer 103. The server inventory computer 105 is connected to or equipped with a reading device 107 for reading barcodes of products that are stocked in the physical inventory 113. The client transaction computer 103 is also connected with a reading device 109 for reading barcodes of products that are stocked in the physical inventory 113. The client transaction computer 103 is also equipped or connected to point-of-transaction hardware 111 that facilitates accepting cash payments as well as processing credit card payments.

It should be noted that each of the reading devices 107, 109 and the point-of-transaction hardware 111 are known in the art and are not described in detail herein. Additionally, each of the server inventory computer 105 and a client transaction computer 103 is provided with input and output mechanisms that are not shown, but include for example, keyboards and display screens. A dotted line appears between the physical inventory 113 and both server inventory computer 105 and client transaction computer 103. The dotted line represents that one or more operators of both the server inventory computer 105 and the client transaction computer 103 can access and retrieve goods from the physical inventory 113.

Not only can operators of both the server inventory computer 105 and the client transaction computer 103 access the physical inventory 113, it is expected that recordkeeping related to the physical inventory 113 will be controlled through either or both machines 105, 103. Specifically, an inventory count record for each particular product will be stored in the server inventory computer 105. The inventory count record for each particular product is a record of the number of items in the physical inventory 113 for that particular product. Thus, an inventory count record will be incremented when products are added to the physical inventory 113, and will obviously be decremented when products are either sold or transferred, as discussed further below.

When products are added to the physical inventory 113, either reading device 109, 107 may be used to read the barcodes off the products or the barcodes may be entered manually through a keyboard. When products are added a process is initiated, in the case of the server inventory computer 105 to increment the inventory count record for each particular product. In the case of the client transaction computer 103, additions to inventory are communicated to the server inventory computer 105 such that the inventory count record can be incremented on the server side. If more than one of any particular product is added at a given time, the computers 103, 105 can increment the inventory count record for the particular product with a single read of a barcode or manual entry of the barcode number and an additional entry of the number of the item being added to the physical inventory 113.

It should be noted that the client transaction computer 103 may maintain a local copy of an inventory count record, but that a governing inventory count record for accounting purposes should be maintained centrally. Additionally, the server inventory computer 105 may serve as a central computer for several different shops, thereby keeping an inventory count record for each different shop as well as a global count record for all the shops collectively. Further, the server inventory computer 105 may serve as the central computer for several client transaction computers 103 that are physically located on different premises. Lastly, it should be noted that all communication between the server inventory computer 105 and the client transaction computer 103 and any other client transaction devices may be wired or wireless over local or wide area networks.

Figure 2A:
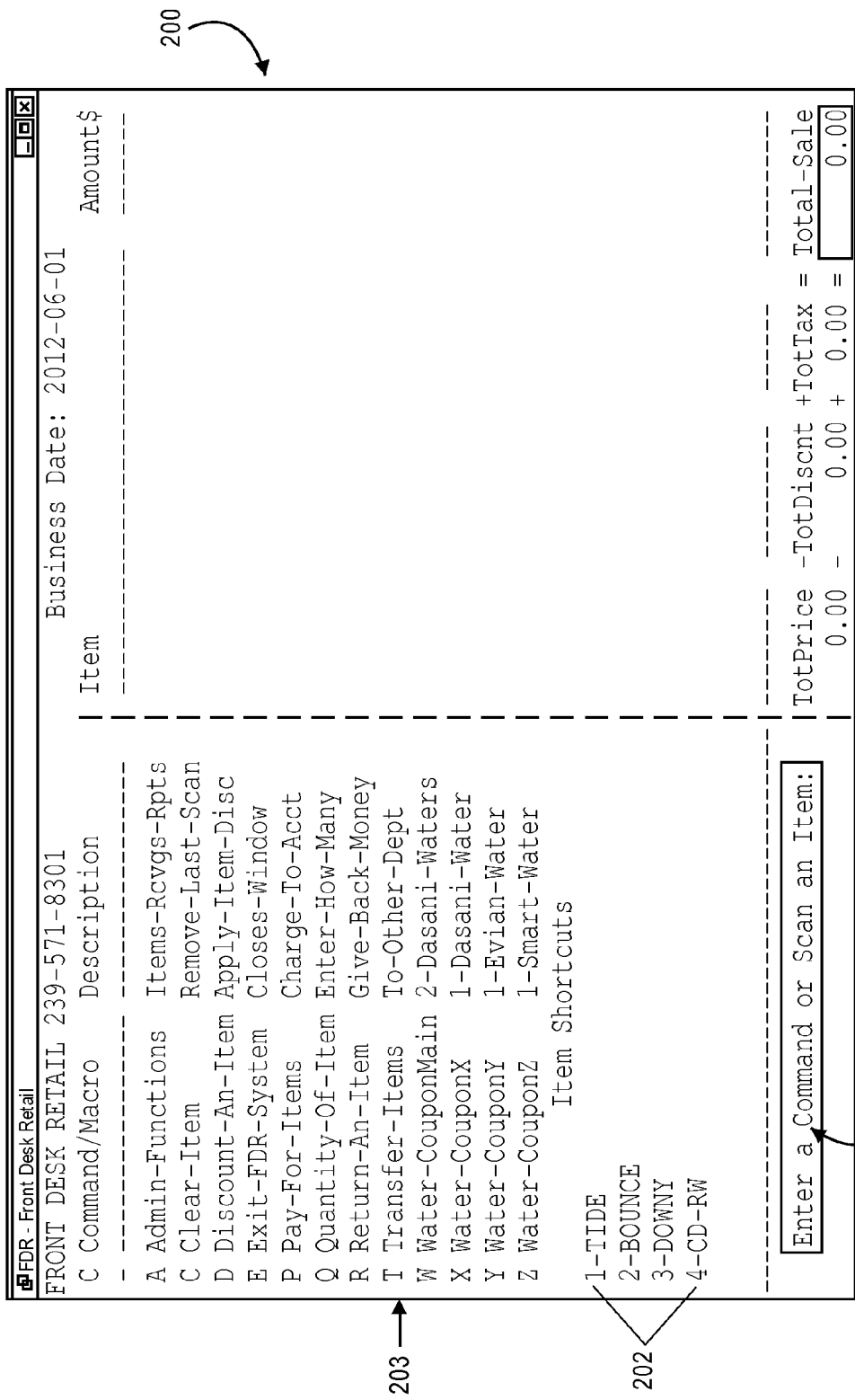

Operation of the point-of-transaction system 101 is best understood through exemplary screen shots taken from an implementation of a point-of-transaction system that processes sales and non-monetary transfers. Thus, FIGS. 2A-2E, illustrating such screen shots, are now discussed and described. The point-of-transaction system 101 performs a transaction cycle that begins with a prompt on a single screen for input as to whether a transaction is to be a sale or non-monetary transfer. Such a prompt is illustrated in FIG. 2A.

The exemplary introductory screen 200 in FIG. 2A illustrates an input entry tine 201. If a user, such as a hotel convenience store cashier (which often times is also the front desk clerk at the hotel) either manually enters or reads a barcode corresponding to any product for sale in the convenience store, without any additionally keystrokes, the client transaction computer 103 interprets such an entry as an identification of the transaction as a sale of the indicated product. Additionally, the cashier could annually enter any of the shortcut numerals 202 that associate the numerals 1, 2, 3, and 4 with four of the most popular products at the shop (e.g., Tide™, Bounce™, Downy™, and/or a read-write compact disc, respectively). In summary, manual entry of any barcode of a product, entry of a barcode of a product through a reader, or selection of a product through manual entry of a shortcut numeral will each serve to identify a transaction as a retail sale.

Of course, the single introductory screen 200 also allows for an identification of a transaction as a non-monetary transfer. Specifically, the cashier or front desk clerk can annually enter a shortcut key 203 that associates the letter "T" with a non-monetary transfer. Thus entry of the shortcut letter "T" will identify a transaction as a non-monetary transfer.

In summary, FIG. 2A illustrates a prompt on a single screen (and at a single and particular point in time) for an identification of a transaction as a sale or as a non-monetary transfer. It should be noted that introductory screen 200 is an embodiment where selection of a product without any other keystrokes defaults to a sale. While this would be a typical embodiment, a second embodiment would feature a more generic introductory screen where the cashier might be prompted only to select "Sale" or "Transfer" (using corresponding shortcuts "S" and "T" respectively) prior to any opportunity for identification of particular goods. A third embodiment would include an introductory screen where selection of a product without any other keystrokes would default to a non-monetary transfer. In such an embodiment, manual entry of any barcode of a product, entry of a barcode of a product through a reader, or selection of a product through manual entry of a shortcut numeral would serve to identify a transaction as a non-monetary transfer. As would be expected, in this alternative embodiment, manual entry of a shortcut key "S" that is associated with a retail sale would identify a transaction as a sale.

The transaction cycle also includes the client transaction computer accepting through an input, an identification of a good that is a subject of the transaction, irrespective of whether the transaction is a sale or transfer. The good that is the subject of the transaction is of course to be delivered out of an inventory of the hotel convenience shop to, for example, an infrequent hotel guest (who will pay for the good) or to a frequent hotel guest (who will receive the item free of charge transfer as part of a rewards program).

As indicated above, in the embodiment where the introductory screen 200 defaults to a sale, the identification of the good occurs simultaneously to the identification of the transaction as a sale. In such an embodiment, where the transaction is identified as a transfer, the cashier or clerk would subsequently manually enter a barcode of the good, enter a barcode of the good through a reader, or select the good through manual entry of one of the shortcut numerals 202 illustrated in FIG. 2A. Similar techniques are used to identify the good that is the subject of the transactions in the other embodiments described above.

The transaction cycle further includes the server inventory computer 105 communicating a sales price, stored in a memory of the computer 105, to the client transaction computer 103 when the transaction is identified as a sale. As seen in FIG. 2B(1), the client transaction computer 103 then displays a first indication of the good 205 along with a sales price 207 of the good. It should be noted that the total value of the transaction is indicated in the sales field 206 at the bottom of the screen 208. At this point, it should be noted that a sales price of a good includes any applicable taxes. However, this is a matter of design, and processing of sales could be performed in the point of transaction system without taxes included. Such a modification would be determined by a merchant according to what is most suitable for the merchant's accounting practices.

The total value of the transaction indicated in the sales field 206 may vary depending on a total number of goods that are included in a particular transaction. This conclusion assumes what has not previously been expressly stated, which that the present implementation of the transaction cycle allows for a plurality of different goods to be included in the transaction. In addition, multiple quantities of each different good can be identified as part of the transaction. Further, various quantities of multiple goods can be selected for non-monetary transactions and various quantities of multiple goods can be selected for sales in the same transaction, Nonetheless for ease in explanation, simpler screen shots are presented that illustrate a single good at a time being sold or transferred, as will be discussed again shortly below.

The transaction cycle further includes the server inventory computer 105 communicating a cost price of the good (which as described above, reflects a cost to obtain the good for the inventory) to the client transaction computer 103 when the transaction is identified as a non-monetary transfer. As seen in FIG. 2B(2), the client transaction computer 103 then displays a second indication of the good 210 along with the cost price 209 of the good. It should be noted that the total value of the transaction is indicated in the sales field 212 at the bottom of the screen 208. As can be clearly seen by comparing FIGS. 2B(1) and 2B(2), there is a substantial difference between the retail price to buy the good ($2.00) and the cost price to obtain the good ($0.47).

should further be noted that irrespective of whether the transaction is a sale or a non-monetary transfer, the sales price or the cost price, respectively are indicated as a "Total-Sale." This fact demonstrates one principle of the embodiments disclosed herein, which is that both sales and non-monetary transactions are processed in a single thread. Said another way, transfers and sales are treated similarly along a single processing path as opposed to parallel processing paths.

Of course accepting payment for a sale of a good, or identifying a responsible party to whom the cost price of a transferred good will be attributed, is part of the processing of sales and non-monetary transfers. This aspect of the transaction processing is discussed further below for various reasons. What is next discussed, however, relates to record keeping and inventory management related to completed transactions in the transaction cycle.

In particular, the transaction cycle includes the server inventory computer 105 creating and storing in the memory of the server inventory computer 105, a record of the transaction. The record of the transaction includes whether the transaction is the sale or the non-monetary transfer of the good. Additionally, the record includes the sales price or the cost price, depending on whether the transaction is the sale or the non-monetary transfer.

FIG. 2C(1) illustrate a record 216 of a sale of two different goods. The record 216 shows a good 205 that is the subject of the transaction, as well as an indication 211 that the transaction is a sale (as a sales tax is included). The record 216 also shows the sales amount 214 of the good. A record 218 of a non-monetary transfer is shown in FIG. 2C(2). The record 218 shows a good 205 that is the subject of the transaction, as well as an indication 213 that the transaction is a non-monetary transfer (statement that product is being "TRANSFERRED@Cost"). The record 218 also demonstrates a cost price 220 of the good.

It should be noted that the records 216 and 218 appear in the form a receipt. Such a receipt could either be displayed or printed from either the server inventory computer 105 or the client transaction computer 103. However, even if a record of a transaction is not printed or displayed, the information presented in the record is always stored in the server inventory computer 105 for use in inventory record keeping.

The transaction cycle further includes the server inventory computer 105 adjusting, based on the occurrence of the transaction, an inventory count record. The inventory count record is of course representative of the number of units of a good on hand in the physical inventory 113. The inventory count record is stored in memory of the server inventory computer 105. The inventory count record for a good is thus decremented when a sale or non-monetary transfer occurs. Further, the inventory count record is incremented when goods are returned to the store on an account of some dissatisfaction, as well as simply when goods are added to inventory for the purpose of ensuring enough quantity to meet demand.

FIG. 2E illustrates a screenshot of an inventory summary 222 that is produced by an implementation of the point-of-transaction system 101 discussed herein. FIG. 2E shows the inventory on hand of various goods that are sold in the shop. For example, in the inventory summary 222, it can be seen from reference character 231 that there are a total of 30 Minute Maid™ Apple Juice units in the inventory of the Fancy Hotel Convenience Shop & Market. Further reference character 229 indicates that there are a total of 68 Coca-Cola™ Zero units in the inventory of the Fancy Hotel Convenience Shop & Market.

As indicated above, on-hand amount in the inventory is decremented for each transaction, irrespective of whether the transaction is a sale or a non-monetary transfer. Thus for example, if 20 Coca-Cola™ Zero units are provided from the Market to an employee of the Hotel Special Events department for giving away at a seminar held at the hotel, the on-hand count 229 of Coca-Cola™ Zero would be reduced by 20 from 68 to 48.

It should be noted that, as indicated above, returns to the Market as well as normal replenishment of inventory will result in the on-hand inventory count of various goods to rise. Further, an on-hand inventory count should only be negative where newly added or returned inventory items are not properly recorded. In those instances, a failure to increment inventory may result in an eventual negative inventory account as goods are transferred or sold.

It should be noted that an inventory summary 222 can be generated at any given time. In FIG. 2E, the inventory summary 222 demonstrates a state where the transaction cycle has occurred over a plurality of transactions. The inventory summary 222 can of course be printed or displayed. However, even if the record of a transaction is not printed or displayed, the information stored in the inventory summary 222 is maintained internally for various uses. Having adjusted inventory to reflect the occurrence of a transaction, the transaction cycle is now complete.

As mentioned above, accepting payment for a sale of a good, or identifying a responsible party to whom the cost price of a transferred good will be attributed, is part of the processing of sales and non-monetary transfers. However, there is distinction between the process of identifying a transaction, identifying a good, and recording inventory operations related thereto and actually processing payments for sales and identifying responsible parties for non-monetary transfers. The distinction relates to separate processing paths.

Specifically, in the present embodiment it is more efficient and faster to allow settlement of a transaction to occur in the client transaction computer 103. After the client transaction computer 103 displays the first indication of a good 205 or the second indication of a good 210, and prior to the server inventory computer 105 creating and storing a record and adjusting an inventory count record, the client transaction computer 103 implements a settlement cycle. The settlement cycle will of course be different when a transaction is a sale as opposed to when a transaction is a non-monetary transfer.

FIG. 2D(1) illustrates initiation of the settlement cycle for receiving payment when the transaction is a sale. Specifically, a first indication of a good 205 indicates that a single unit of Tide™ is being purchased. As is clear, several other goods are intended to be purchased. The settlement cycle for a sale is initiated when a pay option 215 is indicated.

When the transaction has been identified as a sale, and the settlement cycle is initiated, the client transaction computer 103 will accept through an input, an identification of a manner of payment of the sales price. This scenario is illustrated in FIG. 2D(2). Specifically, it is possible to pay for the goods 205 identified as the subject matter of the transaction either with cash or by credit card as indicated by reference character 219 or a deferred invoice option 221 is available. In the exemplary embodiment, where the transaction occurs in a hotel convenience shop, the deferred invoice option includes associating the purchase with the room number of the shopping guest. The guest of course pays the invoiced amount at the time of checkout.

When the transaction has been identified as a non-monetary transaction, a responsible party must be identified to whom the cost price of the good will be attributed. Thus in FIG. 2D(3), the cost of the goods 205 that are identified as being transferred without requiring payment will be attributed to an entity presented on the left side of the screen. For example, at 230 in FIG. 2D(3), the total cost price of $0.94 can be attributed to, for example the marketing/sales department 217 or the hotel restaurant 222, The Great NY Grill. It should be noted that if the circumstance were such that the good identified as the subject of the transaction had been a bottle of water, the cost price could be attributed to the hotel Rewards program 224.

The settlement cycle further includes, once the manner of payment or the identification of the responsible party has been received by the client transaction computer 103, the client transaction computer 103 communicating to the server inventory computer 105, either the manner of payment or the identification of the entity to whom the cost price will be attributed. Once received by the server inventory computer 105, the relevant information is included in a record of the transaction. For example, in FIG. 2C(1) the record 216 of a sale includes coded information 226 related to the manner of payment. Similarly, in FIG. 2C(2), the record 218 of a non-monetary transfer includes coded information 228 related to the entity to whom the cost price will be attributed Similar to the inventory summary described above, records related to sales price and manner of payment for each sale over multiple transactions, and records related to cost price and attribution for each non-monetary transfers over a plurality of transactions, can be aggregated into summary form. Thus FIG. 2D(4) illustrates a retail sales and inhouse-transfers summary 226. The summary 226 concerns a plurality of transactions over a period from May 1, 2012 through May 3, 2012, as indicated by reference character 228.

The summary 226 indicates at 223 that cash and credit card sales for the plurality of transactions over the stated period have totaled $647.00. Further, the summary 226 indicates at 225 that deferred invoice sales (associating each purchase with a guest room number—room charge) for the plurality of transactions over the stated period totaled $1,037.75. It should be noted that although not shown, the exact distribution of the $647.00 between cash and credit card sales can also be calculated and shown.

In terms of non-monetary transfers, the summary 226 indicates at 221 that non-monetary transfers (measured in cost price) totaling $7.12 were attributed to the Banquets department of the Fancy Hotel. Further, the summary 226 indicates at 227 that non-monetary transfers (measured in cost price) totaling $23.52 were attributed to the New York Grill. Based on the example data provided above, it can be understood why, as described above, many vendors and merchants would include an introductory screen where selection of a product without any other keystrokes defaults to an identification of a transaction as a sale.

It should be noted that the retail sales and inhouse-transfers summary 226 may be either displayed or printed from either the server inventory computer 105 or the client transaction computer 103. However, even if the summary 226 is not printed or displayed, the information presented in the summary is stored in the server inventory computer 105 for use in inventory and accounting record keeping.

FIGS. 1-2E illustrate a comprehensive point-of-transaction system that dynamically and efficiently determines whether a transaction is a sale or a non-monetary transfer and subsequently records and accounts for both types of transactions. Processing both sales and non-monetary transfers occurs within a single thread paradigm where such sales and transfers are essentially treated the same. This results in faster processing and more efficient allocation of resources.

Figure 3:
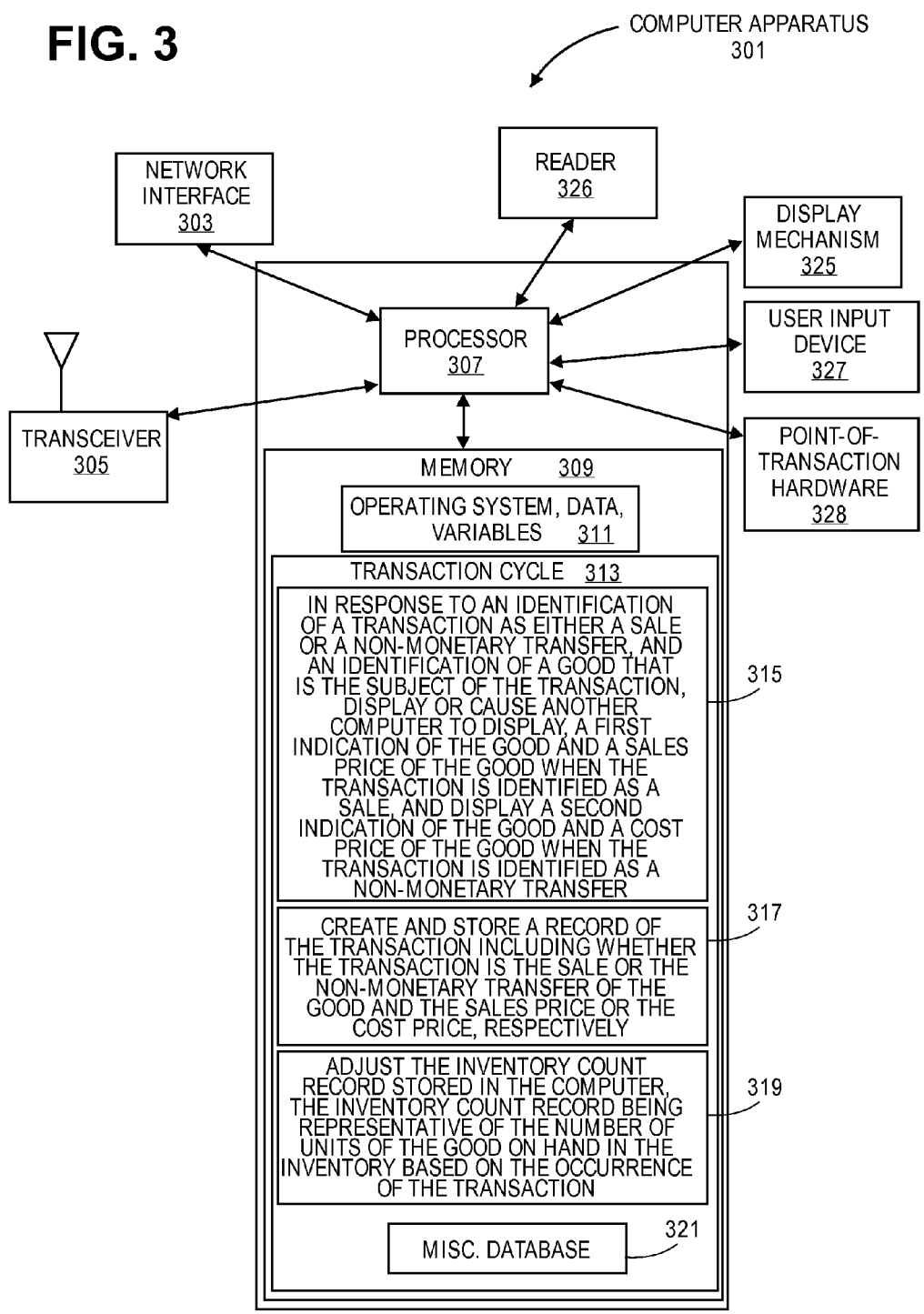
FIG. 3 is a block diagram illustrating a computer apparatus that is functional to process sales and non-monetary transfers.

It should be understood that the client-server architecture discussed above at length with respect to FIGS. 1-2E is but one possible embodiment for processing sales and non-monetary transfers in a point-of-transaction environment. That is to say, the server inventory computer 105 could simply serve as a stand-alone machine that implements the functions of the inventory transaction computer 103 in addition to its own functions. FIG. 3, which is a block diagram illustrating a computer apparatus 301 that is functional to process sales and non-monetary transfers, either in a stand-alone capacity or in a server-client architecture, is now discussed and described.

The computer apparatus 301 for processing sales and non-monetary transfers may include a transceiver 305 for communicating with remote devices wirelessly, a communication port or network interface 303 for communication with external devices over a network, a processor 307, a memory 309, a display mechanism 325, a user input device 327, a code reader 326, and point-of-transaction hardware 328.

The processor 307 may comprise one or more microprocessors and/or one or more digital signal processors. The memory 309 may be coupled to the processor 307 and may comprise a read-only memory (ROM), a random-access memory (RAM), a programmable ROM (PROM), and/or an electrically erasable read-only memory (EEROM). The memory 309 may include multiple memory locations for storing, among other things, an operating system, data and variables 311 for programs executed by the processor 307; computer programs for causing the processor to operate in connection with various functions such as a transaction cycle 313. The computer programs may be stored, for example, in ROM or PROM and may direct the processor 307 in controlling the operation of the computer apparatus 301.

The code reader 326 may be used for identifying objects to be of a particular type or of a particular brand. The code reader 326 is pre-programmed, as is known in the art, such that when various barcodes are read by the reader, a product or good to which the barcode is affixed is identified. The point-of-transaction hardware 328 is known in the art to perform cash and credit card payment processing at the time a transaction is undertaken. As is described further, the point-of-transaction hardware 328 is also configured to attribute cost pricing of a good in a non-monetary transfer to a particular party or entity.

A user of the computer apparatus 301 may invoke functions accessible through the user input device 327. The user input device 327 may comprise one or more of various known input devices, such as a keypad, a computer mouse, a touchpad, a touch screen, a trackball, and/or a keyboard. Responsive to signaling from the user input device 327, and in accordance with instructions stored in memory 309, or automatically upon receipt of certain information via the transceiver 305 or the network interface 303, the processor 307 is made to execute the programs stored in the memory 309.

In particular, the processor 307 may be made to execute the transaction cycle 313. In turn, the processor 307, in response to an identification of a transaction as either a sale or a non-monetary transfer, the identification having been made in response in a prompt from a single screen as to whether the transaction is a sale or a non-monetary transaction, and in response to an identification of a good that is the subject of the transaction, the good to be delivered out of an inventory of a first entity to a second entity upon completion of the transaction, displays 315, or cause to be displayed by another computer, a first indication of the good and a sales price of the good stored in a memory of the computer, when the transaction is identified as a sale. The processor 307 also display 315, or cause to be displayed by another computer, a second indication of the good and a cost price of the good, reflecting a cost of the first entity to obtain the good for the inventory, stored in the memory, when the transaction is identified as a non-monetary transfer.

When the processor 307 further executes the transaction cycle 313, the processor further creates and stores in the computer apparatus 301, a record of the transaction including whether the transaction is the sale or the non-monetary transfer of the good and the sales price or the cost price, respectively. The processor 307 is further adjusts an inventory count record stored in the computer apparatus 301, the inventory count record being representative of the number of units of the good on hand in the inventory based on the occurrence of the transaction.

Figure 4:
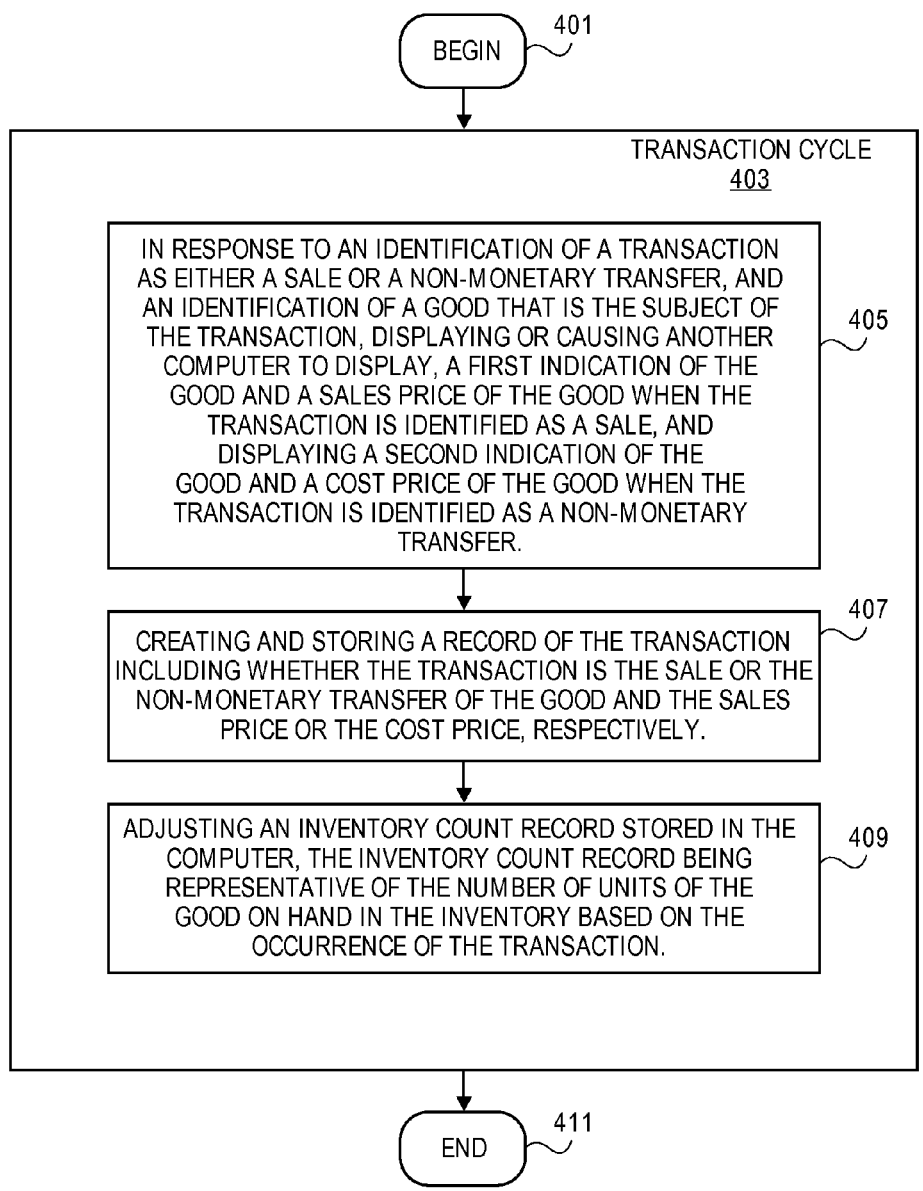
FIG. 4 is a flow diagram illustrating a method for processing sales and non-monetary transfers.

Referring now to FIG. 4, a flow diagram illustrating a method, implemented for processing sales and non-monetary transfers is discussed and described. The procedure can advantageously be implemented on, for example, a computing apparatus 301, described in connection with FIG. 3 or other apparatuses appropriately arranged. At 401, the method for processing sales and non-monetary transfers begins. At 403, a transaction cycle is performed. The transaction cycle 403 includes, in response to an identification of a transaction as either a sale or a non-monetary transfer, the identification having been made in response to a prompt from a single screen as to whether the transaction is a sale or a non-monetary transaction, and in response an identification of a good that is a subject of the transaction, the good to be delivered out of an inventory of a first entity to a second entity upon completion of the transaction, displaying 405, or causing to be displayed by another computer, a first indication of the good and a sales price of the good stored in the computer, when the transaction is identified as a sale and a second indication of the good and a cost price of the good stored in the computer, the cost price reflecting a cost of the first entity to obtain the good for the inventory, when the transaction is identified as a non-monetary transfer.

The transaction cycle further includes creating and storing 407 a record of the transaction including whether the transaction is the sale or the non-monetary transfer of the good and the sales price or the cost price, respectively. The transaction also includes adjusting 409 an inventory count record stored in the computer, the inventory count record being representative of the number of units of the good on hand in the inventory based on the occurrence of the transaction.

It should lastly be noted that the above described system, device, method, and medium, each for processing sales and non-monetary transfers, have been described in a functionally single direction. That is to say, the embodiments described heretofore approach sales and non-monetary transfers from the perspective of goods moving out from inventory to a consumer. However, in any type of store or shop, there will be without a doubt a number of transactions where a good is moved from the possession of a consumer or transferee back into inventory. Correspondingly, as the good is moved back into inventory, a cash or credit card refund in the amount of the sales price will need to be issued, or a credit in the amount of the cost price will need to attributed back to a transferee.

There are still other types of transactions where a good will be physically returned to a store but the good cannot be returned to inventory. Such transaction would occur, for example, where a consumer/transferee returns a partially consumed food or drink item. Such goods simply cannot be returned to inventory but nonetheless will often require a cash refund. These various scenarios may require further processing steps than those heretofore described. However, such further processing has been fully reduced to practice in a manner that is logically the inverse of what has heretofore been described. As such, this disclosure should be viewed as supportive of claimed embodiments related to processing sales and non-monetary transfers in a return or exchange setting.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof.

The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof when interpreted in accordance with the breadth to which they are fairly, legally, and equitably entitled.

What is claimed is:

1. A system, comprising:
    a server device, including a server processor cooperatively operable with a server memory, a server input, and a server display; and
    a point-of-transaction (POT) client device including a client processor cooperatively operable with a client memory, a client input, and a client display, the POT client device being connected over a network with the server device, wherein
    the server device and POT client device implement a transaction cycle that includes:
        the POT client device accepting through the client input, at a prompt from a single screen in the client display at a single and particular point in time, an identification of a transaction as a sale or as a non-monetary transfer;
        the POT client device accepting through the client input, an identification of a good that is a subject of the transaction, the good to be delivered out of an inventory of a first entity to a second entity upon completion of processing of the transaction;
        the server device communicating a sales price of the good, stored in the server memory, to the POT client device when the transaction is identified as a sale, the POT client device then displaying on the client display a first indication of the good along with the sales price of the good;
        the server device communicating a cost price of the good, stored in the server memory, reflecting a cost of the first entity to obtain the good for the inventory, to the POT client device when the transaction is identified as a non-monetary transfer, the POT client device then displaying on the client display a second indication of the good along with the cost price of the good;
        the server device creating and storing in the server memory a record of the transaction including whether the transaction is the sale or the non-monetary transfer of the good; and the sales price or the cost price, respectively; and
        the server device adjusting an inventory count record, being representative of the number of units of the good on hand in the inventory and stored in the server memory, based on an occurrence of the transaction; and
    after the POT client device displays the first indication or the second indication, and prior to the server device creating and storing the record and adjusting the inventory count record, the POT client device and the server device further implement a settlement cycle including:
        the POT client device accepting at the client input an identification of a manner of payment of the sales price when the transaction has been identified as a sale; and
        the POT client device accepting at the client input an identification of an entity to whom the cost price can be attributed when the transaction has been identified as a non-monetary transfer;
        the POT client device communicating to the server device either the manner of payment or the identification of the entity to whom the cost price will be attributed; and
        the server device further including the manner of payment or the identification of the entity in the record of the transaction.

2. The system according to claim 1, wherein
    the manner of payment includes one of a cash/credit card option and a deferred invoice option.

3. The system according to claim 2, wherein
    the server device and the POT client device implement the transaction cycle and the settlement cycle for a plurality of transactions, and
    the server device, based on records created and stored in the server memory during each transaction cycle and settlement cycle for the plurality of transactions, calculates and stores in the server memory:
        a total value of all cash and credit card sales resulting from the plurality of transactions,
        a total amount of all deferred invoice sales resulting from the plurality of transactions, and
        a total amount of all non-monetary transfers, given by a total of a cost price for each non-monetary transfer, resulting from the plurality of transactions.

4. The system according to claim 3, wherein
    the server device or the POT client device
        displays, on the server display or client display, respectively, or
        causes a printer to print
    the total value of all cash and credit card sales, the total amount of all deferred invoice sales, and the total amount of all non-monetary transfers.

5. The system according to claim 1, wherein
    the server device and the POT client device perform the transaction cycle for a plurality of transactions; and
    the server device or the POT client device
        displays, on the server display or client display, respectively, or
        causes a printer to print
    an inventory summary indicating the inventory count record for each good in the inventory.

6. The system according to claim 1, wherein
    the server device or the POT client device
        displays, on the server display or the client display, respectively, or
        causes a printer to print
    the record of the transaction as a receipt of the transaction.

7. A method, implemented by a computer including a processor cooperatively operable with a memory, an input and a display, comprising:

performing, by the computer, a transaction cycle including:
  in response to an identification, received through the input, of a transaction as either a sale or a non-monetary transfer, the identification having been made in response to a prompt from a single screen at a single and particular point in time as to whether the transaction is a sale or a non-monetary transaction, and an identification, received through the input, of a good that is a subject of the transaction, the good to be delivered out of an inventory of a first entity to a second entity upon completion of the transaction, displaying in the display, or causing to be displayed in another computer, a first indication of the good and a sales price of the good stored in the memory, when the transaction is identified as a sale and a second indication of the good and a cost price of the good stored in the memory, the cost price reflecting a cost of the first entity to obtain the good for the inventory, when the transaction is identified as a non-monetary transfer;
  creating and storing in the memory a record of the transaction including whether the transaction is the sale or the non-monetary transfer of the good and the sales price or the cost price, respectively; and
  adjusting an inventory count record stored in the memory, the inventory count record being representative of the number of units of the good on hand in the inventory based on an occurrence of the transaction; and
after displaying in the display, or causing to be displayed in the another computer, the first indication or the second indication, and prior to creating and storing the record and adjusting the inventory count record, performing by the computer a settlement cycle, including:
  receiving through the input an identification of a manner of payment of the sales price when the transaction has been identified as a sale;
  receiving through the input an identification of an entity to whom the cost price will be attributed when the transaction has been identified as a non-monetary transfer; and
  storing in the memory the manner of payment or the identification of the entity to whom the cost price will be attributed such that the manner of payment or the identification of the entity to whom the cost price will be attributed is included in the record of the transaction.

8. The method according to claim 7, wherein
the manner of payment includes one of a cash/credit card option and a deferred invoice option.

9. The method according to claim 8, further comprising:
performing, by the computer, the transaction cycle and settlement cycle for a plurality of transactions; and
based on records created for the plurality of transactions, calculating by the computer and storing in the memory:
  a total value of all cash and credit card sales resulting from the plurality of transactions,
  a total amount of all deferred invoice sales resulting from the plurality of transactions, and
  a total amount of all non-monetary transfers, given by a total of the cost price for each non-monetary transfer, resulting from the plurality of transactions.

10. The method according to claim 9, further comprising:
displaying in the display or printing by a peripheral of the computer, or causing to be displayed in, or printed by a peripheral of, the another computer,
the total value of all cash/credit card sales, the total amount of all deferred invoice sales, and the total amount of all non-monetary transfers to be displayed or printed.

11. The method according to claim 7, further comprising:
performing, by the computer, the transaction cycle for a plurality of transactions; and
displaying in the display or printing by a peripheral of the computer, or causing to be displayed in, or printed by a peripheral of, the another computer,
an inventory summary indicating an inventory count record for each good in the inventory.

12. The method according to claim 7, further comprising:
displaying in the display or printing by a peripheral of the computer, or causing to be displayed in, or printed by a peripheral of, the another computer,
the record of the transaction as a receipt of the transaction.

13. A non-transitory computer readable storage medium with instructions stored thereon, that when executed by a computer including a processor cooperatively operable with a memory, an input and a display, cause the computer to perform the method comprising:
performing a transaction cycle including:
  in response to an identification, received through the input, of a transaction as either a sale or a non-monetary transfer, the identification having been made in response to a prompt from a single screen at a single and particular point in time as to whether the transaction is a sale or a non-monetary transaction, and an identification, received through the input, of a good that is a subject of the transaction, the good to be delivered out of an inventory of a first entity to a second entity upon completion of the transaction, displaying in the display, or causing to be displayed in another computer, a first indication of the good and a sales price of the good stored in the memory, when the transaction is identified as a sale and a second indication of the good and a cost price of the good stored in the memory, the cost price reflecting a cost of the first entity to obtain the good for the inventory, when the transaction is identified as a non-monetary transfer;
  creating and storing in the memory a record of the transaction including whether the transaction is the sale or the non-monetary transfer of the good and the sales price or the cost price, respectively; and
  adjusting an inventory count record stored in the memory, the inventory count record being representative of the number of units of the good on hand in the inventory based on an occurrence of the transaction; and
after displaying, or causing to be displayed in the another computer, the first indication or the second indication, and prior to creating and storing the record and adjusting the inventory count record, performing by the computer a settlement cycle, including:
  receiving through the input an identification of a manner of payment of the sales price when the transaction has been identified as a sale;
  receiving through the input an identification of an entity to whom the cost price will be attributed when the transaction has been identified as a non-monetary transfer; and
  storing in the memory the manner of payment or the identification of the entity to whom the cost price will be attributed such that the manner of payment or the identification of the entity to whom the cost price will be attributed is included in the record of the transaction.

14. The non-transitory computer readable storage medium according to claim 13, wherein
the manner of payment includes one of a cash/credit card option and a deferred invoice option.

15. The non-transitory computer readable storage medium according to claim 14, wherein the method further comprises:
performing the transaction cycle and the settlement cycle for a plurality of transactions; and
based on records created for the plurality of transactions, calculating by the computer and storing in the memory:
a total value of all cash and credit card sales resulting from the plurality of transactions,
a total amount of all deferred invoice sales resulting from the plurality of transactions, and
a total amount of all non-monetary transfers, given by a total of the cost price for each non-monetary transfer, resulting from the plurality of transactions.

16. The non-transitory computer readable storage medium according to claim 15, wherein the method further comprises:
displaying in the display or printing by a peripheral of the computer, or causing to be displayed in, or printed by a peripheral of, the another computer,
the total value of all cash/credit card sales, the total amount of all deferred invoice sales, and the total amount of all non-monetary transfers.

17. The non-transitory computer readable storage medium according to claim 13, wherein the method further comprises:
performing the transaction cycle for a plurality of transactions; and
displaying in the display or printing by a peripheral of the computer, or causing to be displayed in, or printed by a peripheral of, the another computer,
an inventory summary indicating an inventory count record for each good in the inventory.

18. The non-transitory computer readable storage medium according to claim 13, wherein the method further comprises:
displaying in the display or printing by a peripheral of the computer, or causing to be displayed in, or printed by a peripheral of, the another computer,
the record of the transaction as a receipt of the transaction.

19. A computer apparatus, comprising:
a transceiver operable to transmit and receive communications over at least a portion of a wireless network;
a network interface operable to transmit and receive communications over at least a portion over a wired network;
a memory;
a display; and
a processor cooperatively operable with the transceiver, the network interface, and the memory, and configured to perform:
a transaction cycle including:
in response to an identification, received through the transceiver or network interface, of a transaction as either a sale or a non-monetary transfer, the identification having been made in response to a prompt from a single screen at a single and particular point in time as to whether the transaction is a sale or a non-monetary transaction, and an identification, received through the transceiver or network interface, of a good that is the subject of the transaction, the good to be delivered out of an inventory of a first entity to a second entity upon completion of the transaction, displaying in the display, or causing to be displayed in another computer, a first indication of the good and a sales price of the good stored in the memory, when the transaction is identified as a sale and a second indication of the good and a cost price of the good stored in the memory, reflecting a cost of the first entity to obtain the good for the inventory, when the transaction is identified as a non-monetary transfer;
creating and storing in the memory, a record of the transaction including whether the transaction is the sale or the non-monetary transfer of the good and the sales price or the cost price, respectively; and
adjusting an inventory count record stored in the memory, the inventory count record being representative of the number of units of the good on hand in the inventory based on an occurrence of the transaction; and
after displaying in the display, or causing to be displayed in another computer, the first indication or the second indication, and prior to creating and storing the record in the memory and adjusting the inventory count record, a settlement cycle, including:
receiving through the transceiver or network interface an identification of a manner of payment of the sales price when the transaction has been identified as a sale;
receiving through the transceiver or network interface an identification of an entity to whom the cost price will be attributed when the transaction has been identified as a non-monetary transfer; and
storing in the memory the manner of payment or the identification of the entity to whom the cost price will be attributed such that the manner of payment or the identification of the entity to whom the cost price will be attributed is included in the record of the transaction.

20. The computer apparatus according to claim 19, wherein
the manner of payment includes one of a cash/credit card option and a deferred invoice option.

21. The computer apparatus according to claim 20, wherein the processor is further configured to perform:
the transaction cycle and the settlement cycle for a plurality of transactions; and
based on records created for the plurality of transactions, calculating and storing in the memory:
a total value of all cash and credit card sales resulting from the plurality of transactions,
a total amount of all deferred invoice sales resulting from the plurality of transactions, and
a total amount of all non-monetary transfers, given by a total of the cost price for each non-monetary transfer, resulting from the plurality of transactions.

22. The computer apparatus according to claim 21, wherein the processor is further configured to perform:
displaying in the display or printing by a peripheral of the computer apparatus, or causing to be displayed in, or printed by a peripheral of, the another computer,
the total value of all cash/credit card sales, the total amount of all deferred invoice sales, and the total amount of all non-monetary transfers.

23. The computer apparatus according to claim 19, wherein the processor is further configured to perform:
the transaction cycle for a plurality of transactions; and
displaying in the display or printing by a peripheral of the computer apparatus, or causing to be displayed in, or printed by a peripheral of, the another computer,
an inventory summary indicating an inventory count record for each good in the inventory.

24. The computer apparatus according to claim 19, wherein the processor is further configured to perform:

displaying in the display or printing by a peripheral of the computer apparatus, or causing to be displayed in, or printed by a peripheral of, the another computer,
the record of the transaction as a receipt of the transaction.

\* \* \* \* \*